Feb. 8, 1966
L. R. SWIFT
3,233,281
HOLDER FOR MAKING SAUSAGES OR THE
LIKE IN FLEXIBLE TUBULAR CASINGS
Filed May 21, 1963
2 Sheets-Sheet 2
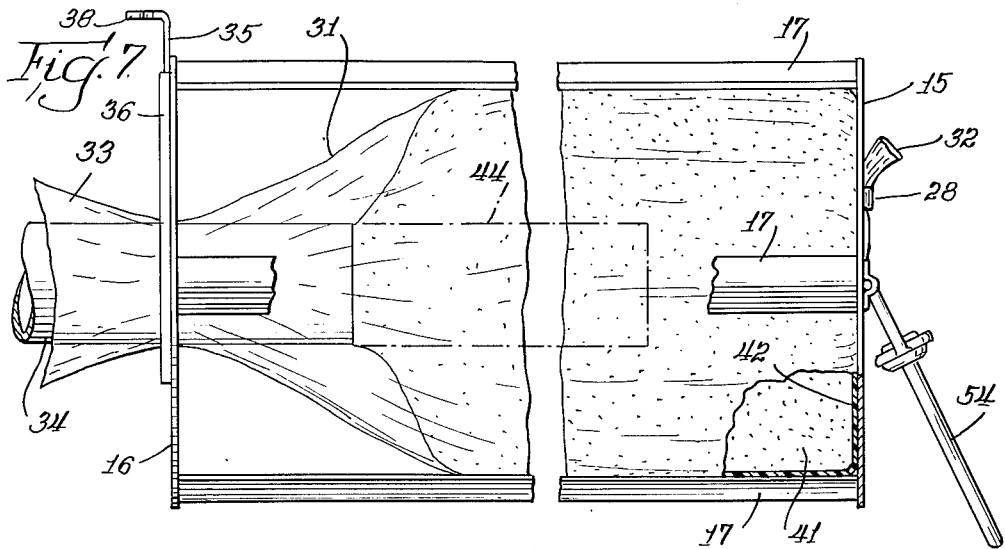
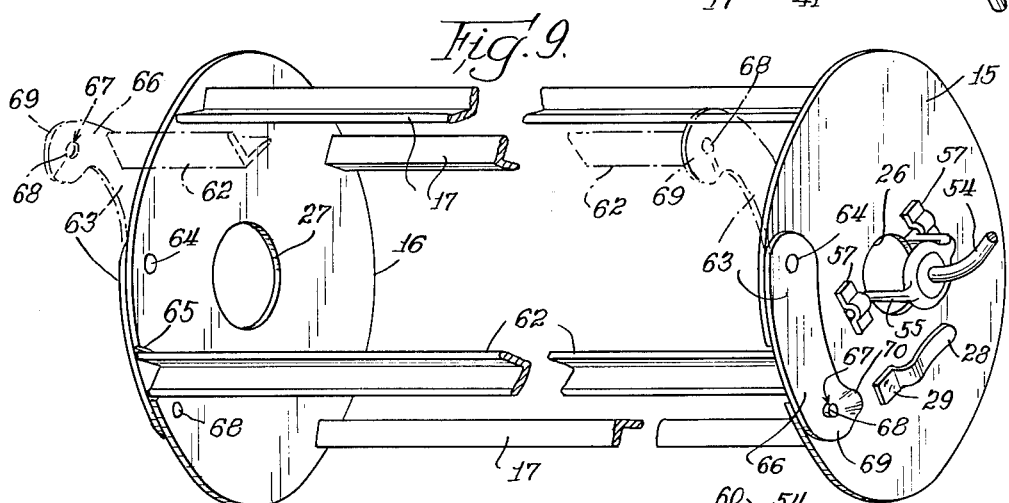
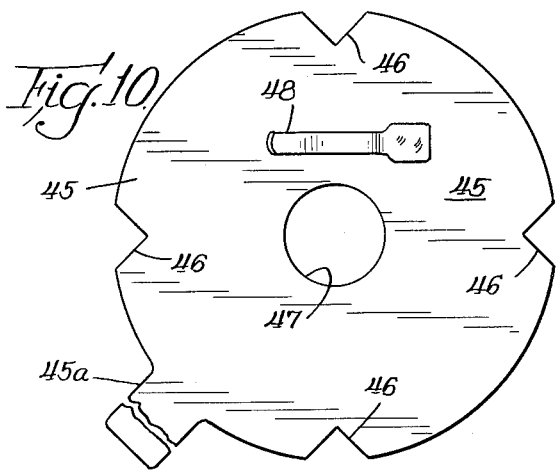
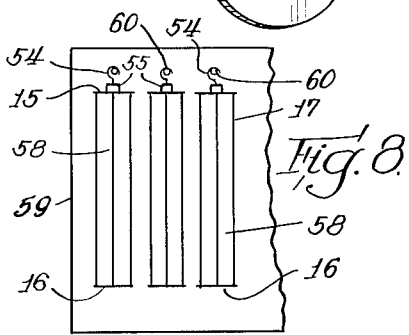
INVENTOR.
Lee R. Swift
BY
Mann, Brown & McWilliams
Atty

United States Patent Office 3,233,281
Patented Feb. 8, 1966

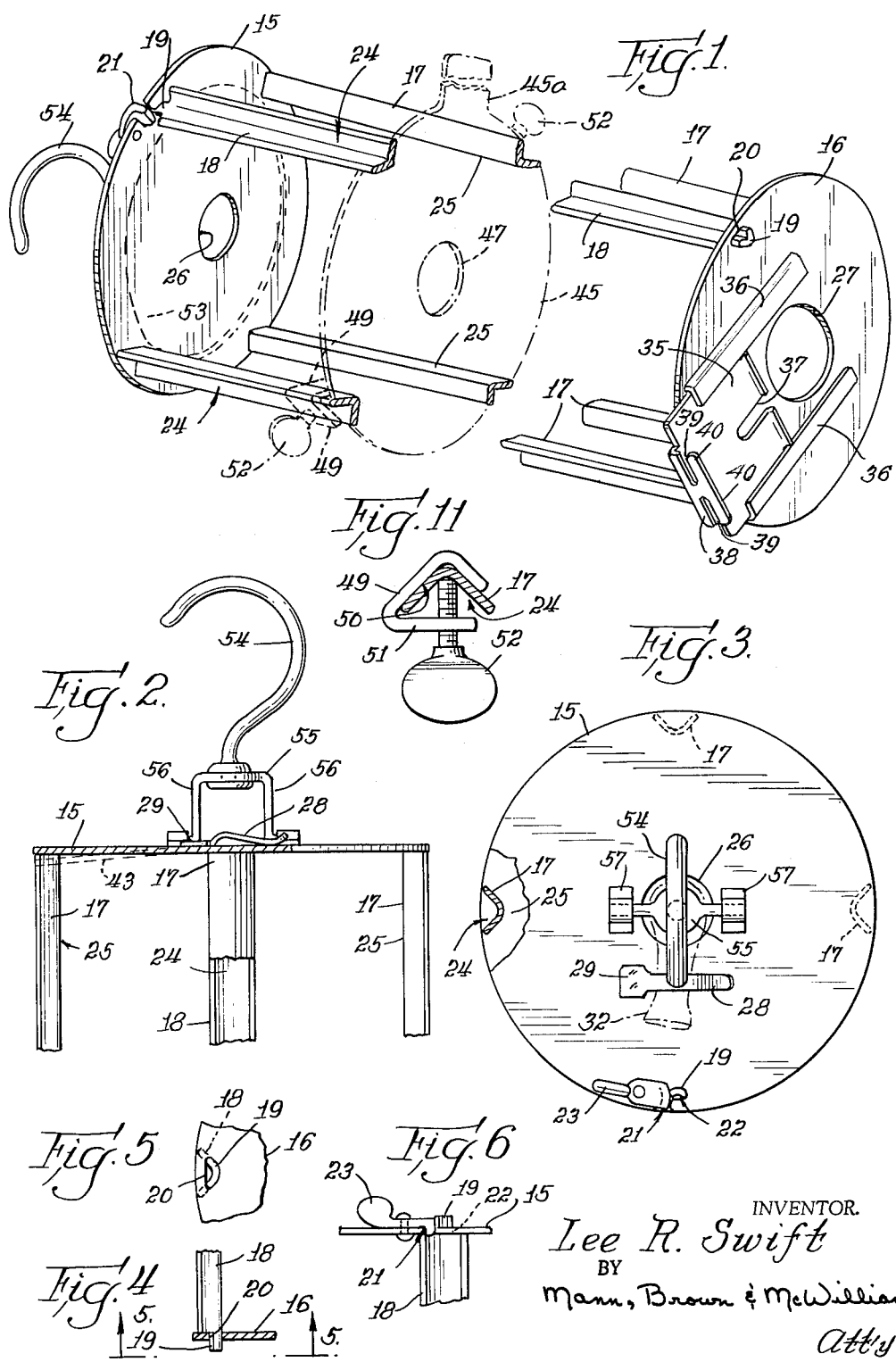

3,233,281
HOLDER FOR MAKING SAUSAGES OR THE LIKE IN FLEXIBLE TUBULAR CASINGS
Lee R. Swift, 643 N. Spring Ave., La Grange Park, Ill.
Filed May 21, 1963, Ser. No. 282,084
2 Claims. (Cl. 17—44.2)

This invention relates to a holder for supporting elongated flexible tubular casings for stuffing sausage or other comminuted edible material therein, and has reference more particularly to a holder in which such assembly of sausage or other comminuted edible material in an elongated tubular casing is produced with casing covered flattened ends.

Sausages are commonly made in elongated cylindrical form by stuffing comminuted sausage material into elongated tubular casings of thin flexible membranous material, usually of a porosity or permeability for penetration therethrough of smoke fumes or other treating media to which the sausage material is usually exposed after it is stuffed in the casing.

Sausages which are intended for consumer use in slices are usually made in large sizes, as for example from three to three and a half feet in length and from four to five inches in diameter to provide slices appropriate for sandwich use, and it has been customary heretofore in making such sausages to stuff the sausage material into the tubular casing while the latter is confined peripherally throughout its length in a rigid cylindrical tube or holder of internal diameter corresponding to that of the sausage to be made therein. Thus, as heretofore prepared, the casing is not exposed for observation or manipulation during the stuffing operation and moreover it is necessary to remove the thus prepared sausage from the tube or holder for direct application to the casing of smoke fumes or other media to which the sausage is to be subjected after it is stuffed into the casing.

For making such sausages, casing are employed which are longer than the sausage to be made therewith to provide extra length at each end for closing, and before the casing is stuffed, one end of the casing is closed, usually by twisting or puckering the end portion of the casing together and tying a cord therearound or applying a clip thereto, and the other end, which is left open for insertion of a nozzle, or horn as it is usually referred to, through which the comminuted sausage is stuffed in the casing, is usually closed in like manner after the stuffing has been completed and a loop of the tying cord or other suitable means is also usually provided at one end of the sausage for hanging thereof in a smoke room or for other treatment thereof.

This tying or clip fastening of the sausage ends and provision of the loop or other suitable suspension means not only is time consuming and adds to the cost of the sausage, but usually produces rounded sausage ends which are objectionable on account of the unsuitability thereof for slicing and the sausage wastage which occurs on account thereof.

The principal objects of the invention are, to provide an improved holder for making sausages and the like in flexible tubular casings; to provide peripheral exposure and access to the sausage throughout the length thereof during the stuffing operation and permit smoking or other treatment of the sausage without removal thereof from the holder; to eliminate time consuming operations and expense of tying or applying clips to the casing ends for closure thereof and provide simple convenient and quick operating facilities for closing the casing ends; to eliminate rounded sausage ends and insure flat ends which avoid wastage; to provide convenient adaptability of the holder to make sausages of different lengths therein; to eliminate the need for individual suspension means for each sausage; and in general to simplify, expedite and facilitate the making of sausages and the like and minimize the cost thereof, these and other objects being accomplished as pointed out more particularly hereinafter and as shown in the accompanying drawings in which:

FIG. 1 is a perspective view, with an intermediate portion of the length broken away, of a sausage making holder illustrative of the invention and showing the filler end foremost;

FIG. 2 is a side view of a fragmentary end portion of the holder of FIG. 1;

FIG. 3 is a plan view of the outer side of the holder end of FIG. 2 with portions broken away to show one of the side members of the holder in section;

FIG. 4 is a detail view of the fastening of one end of one of the elongated sausage confining elements of the holder;

FIG. 5 is a view of the fastening of FIG. 4 taken on the line 5—5 thereof;

FIG. 6 is a detail view of the latch fastening at the opposite end of the elongated sausage confining element of FIG. 4;

FIG. 7 is a side view of the holder of FIG. 1 with an intermediate portion broken away and showing the sausage casing therein and partly filled;

FIG. 8 is a diagrammatic view showing sausage holders of this invention containing stuffed sausage as suspended in a smoke room for smoke curing;

FIG. 9 is a perspective view, similar to that of FIG. 1, but with the hanger end of the holder foremost, and shows a modification of the holder;

FIG. 10 shows an adapter and follower plate for the holder; and

FIG. 11 shows a clamp for locating the adapter plate in sausage length determining position in the holder.

Referring first to FIGS. 1 to 7 inclusive of the drawings, the holder shown therein comprises two end plates 15 and 16 having a circular series of elongated elements extending therebetween and conjointly therewith providing an elongated cage-like holder for making and holding encased sausages individually therein.

Four such elongated elements, as shown herein, are sufficient and preferable and are arranged at 90 degree intervals around and equally distant from and in parallelism with the central longitudinal axis of the holder for peripheral engagement at 90-degree intervals around and lateral support throughout its length of a long cylindrical sausage made in the holder.

Three of these elongated elements, which are indicated by the reference numeral 17, are fixedly secured at their opposite ends to the respective plates 15 and 16 and serve as spacers which hold the end plates 15 and 16 in separated parallel relation at a distance apart corresponding to the length of the sausage to be made therein, whereas the other one of the four elongated elements, which is indicated by the reference numeral 18, is removable to provide sidewise access to the interior of the holder for removal of the sausage made therein.

Any convenient means may be employed to provide such removability of the element 18, the element being shown in FIG. 1 as provided with the opposite ends shouldered to provide a reduced extension 19 at each end, and the plate 16 is provided at a appropriate place with a closed opening 20 in which one end extension 19 is engaged and the other end plate 15 is provided at a matching place with a bayonet slot 21 in which the other end extension 19 is applicable laterally and locked in an offset 22 at the inner end of the bayonet slot by a latch 23 pivoted on the end plate 15. Thus the element 18 is readily removable and when removed leaves one side of the cage completely open.

The elongated spacing and sausage supporting elements 17 and 18 may be of any type to provide desired rigidity of the assembly and minimize coverage of the peripheral area of the encased sausage which is desirable for adequate and uniform exposure of the sausage, while confined in the holder, to smoke or other treating medium, elements of V-shaped cross section with the apex edge thereof presented toward the central longitudinal axis of the holder being particularly advantageous because of the narrow width of bearing of the apex against the casing of the confined sausage.

Accordingly, the elements 17 and 18 are shown herein of angle iron form with the V-shaped channel 24 thereof facing outwardly and the V-edge or apex 25 thereof presented directly inward toward the central longitudinal axis of the holder and it is important that the apex 25 be sufficiently rounded to avoid any cutting effect or damage to the sausage casing applied thereagainst.

For assurance of orientation of the element 18 in the proper position with its apex edge 25 presented inwardly, the opening 20 of the plate 16 and the end extension 19 engaged therein have keying engagement with one another to index and hold the element 18 in the proper oriented position, and the offset 22 of the bayonet slot 21 is also shaped to receive and hold the extension 19 therein in properly indexed position.

These holders are made in sizes corresponding to the size of the sausage to be made therein, with the elements 17 and 18 radially distant from the longitudinal axis of the holder a suitable distance to snugly confine the cylindrical sausage of the particular size to be made therein, and the end plates 15 and 16 which determine the length of the sausage are disposed at a distance apart from one another to accommodate the desired length of sausage therebetween, and casings are, of course, employed therewith of suitable length for end closure of the stuffed sausage and of suitable peripheral dimension to be filled out by the comminuted sausage stuffed therein to the cylindrical size for which the holder is designed so that the cylindrical sausage made therein will be closely confined throughout its length by the elements 17 and 18.

In making sausage of the character to which this invention relates, it is customary to employ a sausage stuffing machine having a tubular nozzle or horn through which comminuted sausage is suppliable under suitable pressure to fill the casing compactly with the comminuted sausage, and the casing is disposed for stuffing, or filling thereof, customarily in a tubular holder, with the nozzle or horn inserted well into one end of the casing with the casing held in position around the horn for safe delivery of the comminuted sausage into the casing, and with the other end of the casing closed so that it forms a long bag for reception and confinement of the comminuted sausage therein.

The holder of the present invention is adapted to be employed in a generally similar manner for filling the casing and for this purpose the end plates 15 and 16 are provided with respective central openings 26 and 27 to receive opposite end portions of the casing therein with the casing extending therebetween within the cagelike holder.

The opening 26 is adapted to receive the closed end of the casing which is twisted or puckered together compactly for closure thereof and may, as customary, be tied with a cord or have a clip applied thereto for this purpose, but it is preferred to provide the end plate with means by which the twisted or puckered end may be conveniently fastened and thus eliminate the tying or application of a clip thereto.

This may be readily accomplished by providing the plate 15 at the outer side thereof with a spring finger 28, as shown in FIGS. 2, 3 and 7, which is secured at one end to the plate, as indicated at 29, by welding or in other convenient manner and extends crosswise of the plate at one side of the opening 26 so that twisted or puckered casing end portion which projects outwardly from the opening 26 may be swung around underneath the spring finger 28 and thus readily and quickly fastened down in position assuring safe closure of the casing end.

FIG. 7 shows a sausage casing at 31 installed in a holder and partially filled and the twisted or puckered end of the casing as thus fastened down is indicated at 32 in FIG. 7 and by dotted lines in FIG. 3.

The opening 27 of the plate 16 is adapted to have the opposite open end of the casing 31 projecting outwardly therethrough, as indicated at 33, in the sausage stuffing operation and to have the horn 34 of the stuffing machine inserted in the projecting open casing end portion 33 and through the opening 27 and into the interior of the casing portion between the end plates 15 and 16 as shown in FIG. 7 and as the sausage casing must be free to adjust itself to the length thereof required between the plates during the sausage stuffing operation, the opening 27 must be sufficiently large to accommodate the horn 34 loosely therein and provide ample clearance to accommodate the casing freely around the horn without interfering with the required freedom of movement of the casing in the opening, and it is of course important that the opening 27, and the opening 26 also, have smoothly rounded edges free of any sharp edges or burrs which might tear or cause damage to the casing portions received therein.

Thus, in preparation for stuffing a sausage casing in the holder, the casing is disposed lengthwise in the holder with one end puckered sufficiently to be passed through and project outwardly from the opening 27 and the other end twisted or puckered to a small size to pass through the opening 26 and fastened down at the exterior of the plate 15 under the clamping finger 28.

The end of the casing, however, which cooperates with the end plate 15, need not be fastened to the plate but may be closed by tying or applying a clip thereto, the hole 26 then serving only to accommodate the tied or clipped end when the sausage is compacted in that end of the casing against the end plate 15.

While the casing may be applied in the holder while the removable sausage confining element 18 is in place thereon, inasmuch as the casing may be applied and manipulated through the peripheral spaces between the elements 17 and 18, it is preferable to remove the holder element 18 to have the cage entirely open at one side for greater freedom of arranging the casing in the lengthwise position and manipulation thereof for inserting the casing ends through the openings 26 and 27.

After the casing is installed in the holder, the latter is applied endwise to the horn 34 of the stuffing machine, which is not shown as it may be of any well known conventional form, and the horn is inserted through the projecting open end 33 of the casing 31 and through the opening 27 of the holder end plate 16 so that the horn projects well into the portion of the casing between the end plates 15 and 16 substantially as indicated in FIG. 7, and the exposed end 33 of the sausage casing may be held at the time to retain it in outwardly projecting position while the horn is inserted in place and because of the looseness of the casing in the opening 27 when the horn has been inserted in place, the exposed end 33 may be pulled outwardly, after the horn is in place, to insure straight outstretched arrangement of the casing in the holder.

After the casing 31 has been thus installed in the holder and applied to the horn 34, the stuffing machine is operated to supply comminuted sausage through the horn into the casing at a suitable pressure to force the sausage to the remote closed end of the casing and compactly in the casing throughout the length thereof, and as the casing fills up to the vicinity of the inner end of the horn 34, the latter may be progressively withdrawn to completely fill and compact the sausage in the final end of the casing up to and against the inner face of the plate 16, whereupon the holder and filled casing are withdrawn from the horn and the casing closed at the finally filled end.

For such closure of the finally filled end, closing means is preferably provided on the plate 16 and may be in the form of a sliding valve-like plate 35 which is slidably mounted at the outer side of the end plate 16 in slideways 36 to slide to a position overlying the opening 27 and to be retracted to a position, as shown in FIG. 1, at one side of the opening 27, said plate having a slot 37 which opens through the inner end of the sliding plate and is adapted to extend across the opening 27 when the slider plate 35 is pushed in to the full extent of its inward sliding movement.

The defining edges of the slot and the inner end edges of the slider plate are well rounded to engage the projecting end 33 of the casing directly at the outer face of the end plate 16 without damage to the casing, and when the casing is completely filled the end 33 thereof is twisted or puckered together and may be flattened somewhat crosswise to permit the slider plate to be pushed inwardly over the opening 27 with the projecting casing end entering and firmly confined in the slot 37 to close the end of the casing.

At its outer end the slider plate 35 has an upturned end 38 for manipulation of the slider and this upturned end 38 is deeply undercut at opposite sides as indicated at 39 to provide oppositely extending prongs 40 under one or both of which the twisted or closely puckered end portion 33 of the casing may be engaged to hold the slider plate in the casing end closing position and insure reliable closure of the casing end.

Each of the end plates 15 and 16 has a substantial area at the inner side thereof around its respective opening 26 and 27 against which the portion of the casing directly inside the opening 26 or 27 is forced by the compacting pressure of the sausage in the filling of the casing and as the plates 15 and 16 and inner face areas thereof are flat, the sausage casing fills out with flat ends and the sausage made in the holder are of uniform cylindrical shape from end to end and provide slices of uniform size throughout the length thereof and avoid objectionable wastage at the sausage ends which occurs with sausages having rounded ends.

FIG. 7 shows the sausage casing in the process of stuffing thereof with the closed end of the casing at the right end of the figure completely filled with comminuted sausage, a portion of the casing 31 being broken away to show the comminuted sausage 41 as compacted therein at that end, and that is to be understood that the sausage is likewise compacted to similar flat end form at the opposite end of the casing.

In this compacting of the sausage against the end plates of the holder, the portion of the casing immediately inside the respective plates 15 and 16 spreads outwardly in flat form, as indicated at 42 in FIG. 7, from the restricted central form thereof in which it is confined in the respective openings 26 and 27 to the full cylindrical size of the sausage, the looseness of the casing end portion 33 around the horn 34 in the opening 27 permitting such retraction of the end portion 33 through the opening 27 into the holder as may be necessary to provide the extra length of casing between the end plates 15 and 16 which is required for producing the flat casing ends 42.

This end flattening of the casing necessarily provides some concentration of casing stock at the respective openings 26 and 27 with the concentration thereof diminishing outward to the outermost extremities of the flattened end portion 42 and accordingly the flattened end portions 42 do have some slight increase in thickness from the outer limits thereof to the respective openings 26 and 27 which may provide some slight concavity of the sausage at the ends, if the interior faces of the plates 15 and 16 are flat throughout, and this slight concavity may be avoided by forming the interior faces of the end plates 15 and 16 with sufficient concavity, as indicated by the dotted line 43 in FIG. 2, to accommodate the concentration of stock at the openings 26 and 27 and diminishing thickness of the flattened casing end portions 42 to insure flat ends of the sausage without any concavity thereof.

It is important to compact the sausage uniformly in the casing throughout the length thereof, and as the length of the casing and distance of the closed end of the casing from the exit end of the horn, in making sausages of considerable length, may interfere with proper compacting of the sausage and sufficient pressure at the closed end of the casing to fill out the closed end of the casing in the desired flattened manner, a longer horn may be provided in such cases which initially projects into the casing sufficiently, as indicated by the dotted lines 44 in FIG. 7, to discharge and compact the sausage directly in the casing end portion of the casing and insure complete flattening at the closed end of the casing, and the holder may be progressively withdrawn from the horn in a regulated manner, as the stuffing of the casing proceeds, to maintain the exit end of the horn sufficiently close to the front of the sausage already compacted in the casing to provide uniformity of compacting throughout the length of the casing and insure complete flattening of the sausage end at the finally stuffed end of the casing.

If, however, the casing at the plate 15 end of the holder is closed with a tied cord or a clip, as it is indicated hereinbefore that it may be, instead of being closed by the fastener tongue 28, and this closed casing end is free to move away from the plate 15, the casing may be pulled outwardly through the opening 27 until the closed end of the casing is close to the exit end of the horn and most of the casing length is beyond the end plate 16 and encircling the horn, and then by inserting the hand between a pair of adjoining sausage confining elements 17 and 18 and yieldingly holding the hand flatwise against the closed end of the casing as the stuffing proceeds a relatively flat closed end will result and the sausage will be uniformly compacted in the casing as the latter slides along the elements 17 and 18 to the plate 15 where the tied or clipped end may enter the opening 26 and the sausage end be jammed against the end plate 15 to impart final flattening of the sausage at the closed end.

Preferably, however, a plate is employed for such purpose, which is slidable along the elements 17 and 18 against manually imposed or other yielding resistance to serve as a backing for the closed end of the casing and insure flattening of the sausage end as the closed end of the casing is filled and to impose resistance for compact progressive uniform filling of the casing as the closed end of the casing is pushed away from the horn by the pressure of the entering sausage, and such plate is also conveniently usable to adapt the holder for making shorter sausage therein.

Such plate is shown at 45 in FIG. 10 and indicated by dotted lines in the holder of FIG. 1 and is similar to the end plate 15 thereof, except that it is provided with peripheral V-notches 46 at quarter turn intervals therearound for sliding engagement with and guiding along the elements 17 and 18. The plate is preferably provided with and extension 45ª which projects outwardly between a pair of elements 17 or 17 and 18 for reasons hereafter explained.

This plate 45 with the four V-notches, may be inserted in the holder by removal of the removable element 18 and tilting the plate 45 sidewise to insert in place and is retained in position after the removable element 18 is returned to its position on the holder.

This plate 45 has a central opening 47 like the opening 26 of the plate 15 to receive the twisted or puckered closed end of the sausage casing therein and preferably also has a spring tongue fastener 48 thereon like the fastener 28 of the plate 15 and located at the side of the plate 45 remote from the filling end of the holder for fastening the projecting closed end of the casing thereunder.

Such plate 45 may be employed to make sausages of selectable shorter lengths in the holder by providing means for locating the plate at the proper distance from the filling end plate 16 to make the selected length of sausage.

Any suitable means may be employed for this purpose, clamps being shown herein which are indicated at 49 in FIG. 11 and also by dotted lines in FIG. 1, and are of a modified C-clamp type with a V-shaped seat 50 to receive the apex edge of an element 17 or 18 therein and an arm 51 extending crosswise of the element at the channel side and having a winged clamping screw 52 threaded through the arm 51 to engage in the bottom of the channel to lock the clamp in selected position on the element.

Two such clamps are sufficient on opposed elements 17 as indicated in FIG. 1 and when both are adjusted along the respective elements 18 to the same selected distance from the plate 16, they provide abutments or stops for the plate 45 which determine the length of the sausage to be made in the holder and permit sliding of the plate 45 to and from the filling end of the holder to facilitate filling of the casing.

When a plate 45 is employed, the end plate 15 may have a large central opening, as indicated by the dotted line 53 in FIG. 1, providing a ring of narrow width for mounting of the elements 17 and 18 at that end of the holder, and that ring may serve as a stop against which the plate 45 is applicable for making full length sausages in the holder, the opening 53 being sufficiently large to expose the opening 47 and fastener 48 of the plate 45 which then replace and serve the same purpose as the opening 26 and fastener 28 of the small opening plate 15 of FIG. 1.

This sausage may be made of the full length of the holder or of any desired intermediate length by locating the clamps 49 to restrict the outward sliding movement of the plate 45 to the desired sausage length and the plate 45 may be positioned close to the end of the stuffing horn and resistively retracted as the stuffing proceeds so as to insure compact stuffing throughout of any length of sausage.

The extension 45ᵃ is convenient for this purpose as it permits convenient manipulation of the plate along the elements 17, 18 or mechanical operation thereof with regulated resistivity of sliding movement away from the discharge end of the horn 34 to resist movement of the closed end of the casing away from the horn end and insure uniform compacting of the sausage in the casing throughout the length thereof.

It is an important feature of the invention that the cage-like form of the holder leaves the peripheral area of the encased sausage made therein exposed sufficiently completely to permit customary smoking or other similar treatment of the sausage without removal from the holder, and thus the sausage not only is stuffed in the holder but also remains in the holder throughout the smoking or other treatment thereof.

Accordingly it is unnecessary to provide each sausage with facilities for individual suspension thereof for smoking treatment, the holder being provided with facilities by which it is suspended with the sausage therein for the operation of smoking.

For this purpose the plate 15 is provided at the outer side with a hook 54 which is mounted on a yoke 55 having spaced apart legs 56 pivoted at their free ends respectively to the plate 15 at opposite sides of the opening 26, as indicated at 57, so that the yoke and hook may be swung down at one side of the opening 26 for free access to that opening for passage of the twisted or puckered end 32 of the sausage casing through the opening 26 and fastening thereof under the spring tongue 28.

If the plate 15 is of ring form with large openings 53 for use as a stop against which the slider plate 45 is applicable, the mounting yoke 55 of the hook may be pivoted to the outer side of the plate 45 but it is preferable to employ a wide yoke 55 which is pivoted to the large opening plate 15 at opposite sides of the opening 53 thereof, if the holder is used for making sausages of different lengths.

Thus when the casings 31 have been stuffed in the holders, the holders are individually suspended with the encased sausage 58 therein in a smoke room 59 by engaging the hooks 54 thereof on hanger rods 60 or other facilities provided therefor as indicated in FIG. 8, and after curing thereof in the smoke room and any further processing thereof, the sausages are readily removed from the holders by retracting the casing end holding plate 35 of the holder end plate 16 to free the casing end projecting through the opening 27, and releasing the casing end 32 from the spring fastener 28 of the plate 15, and removing the element 18 from the holder, whereupon the encased sausage 58 is readily removable sidewise from the holder.

It is to be understood that the casings 31 are made of a material suitable for communication therethrough of the smoke or other medium for flavoring, curing or other similar treatment of the sausage, and because of the narrow width of contact of the edges 25 with the sausage casing, the cylindrical surface of the encased sausage is substantially completely exposed and provides uniform treatment thereof.

When the comminuted sausage is stuffed into the casing 31 it is compacted under pressure and it is necessary for the casing ends to be closed until the sausage is cured. The curing thereof in the smoke room, however, relieves any dormant pressure which may exist in the compressed sausage and sets the sausage with the flattened ends 42 of the casing applied to the sausage ends sufficiently so that the twisted or puckered ends of the casing remain closed, after disengagement thereof from the end fasteners 28 and 35 of the holder and after removal of the encased sausages 58 from the holders.

If desired, the removable element of the holder may be permanently attached to the end plates 15 and 16 and adapted to swing away from the cage closing position as shown in FIG. 9, wherein the removable element is indicated by the reference numeral 62 and is secured at its opposite ends by welding or in other fixed manner, respectively to arms 63 which are disposed respectively at the outer sides of and pivoted respectively to the end plates 15 and 16, so that the element 62 may be swung from the normal cage closing position, indicated in full lines in FIG. 9, to the position indicated by the dotted lines in which the side of the holder or cage normally closed by the element 62 is completely open for unobstructed access to the interior of the cage.

The arms 63 are alike and each preferably is of arcuate form to correspond to the circular form of the plates 15 and 16 to lie along an arcuate marginal portion of the respective plates, and each arm is pivoted to the respective plate 15 or 16, as indicated at 64, at the same distance from the element 62.

The element 62 is of the same V-shape in cross section as the elements 17 and 18, and each plate 15 and 16 is V-notched as at 65 to receive the respective end portion of the element 62 in the notch for disposition of the apex edge of the element 62 at the same distance from the central longitudinal axis of the holder as the fixed elements 17 thereof.

For locking the element 62 in the cage closing position in the notches 65, each arm 63 is extended at its free end beyond the element 62 to provide a spring arm portion 66 therebeyond which is biased toward the respective plate 15 or 16 and has an opening 67 near the outer end which engages a stud 68 projecting outwardly from the respective plate 15 or 16.

Each arm 63 is preferably formed with an outward bulge 70 which slopes inwardly toward the opening 67 to cause the spring arm portion 66 to provide latching engagement of the opening 67 with the stud 68 when the element is swung to the normal cage closing position shown in full lines in FIG. 9, and the extreme end portion 69 of the arm portion 66 is bent outwardly to facilitate manipulation thereof to release the engagement of the opening 67 with the stud 68.

It is to be noted that the holder described herein not only provides lateral access to the interior of the holder for convenient location of the sausage casing therein and proper disposition and closing of the casing ends, and permits sufficiently complete exposure of the sausage casing around the periphery and throughout the length thereof for observation of the filling operation and manipulation of the casing and contents as the filling of the casing proceeds, and permits thorough smoking or other external treatment of the sausage without removal thereof from the holder.

It also permits shaping of the tubular casing and appropriate filling of the casing at both ends to provide encased sausages with flat ends, and permits disposition of the initially filled end of the casing in selectable positions of nearness to the exit end of the stuffing machine horn for compact filling of that end of the casing, and imposition of resistance to retraction of the initially filled end of the casing from the horn exit end as the filling or stuffing of the casing proceeds, and the holder is readily and conveniently adaptable to make sausages of optional length therein, and produces simple and effective closure of the casing ends without application of tying or clip means thereto for closure thereof.

While I have shown and described my invention in a preferred form, I am aware that various changes and modifications may be made therein without departing from the principles of the invention, the scope of which is to be determined by the appended claims.

What is claimed is:

1. A holder for making and supporting therein an elongated generally cylindrical assembly of a mass of edible material compacted in an outstretched portion of a tubular casing of thin flexible material with circumferential portions of the casing inturned radially against the mass of edible material at the ends of the assembly to provide flattened ends therefor, the holder having therein an elongated stuffing zone in which the edible material and casing are assembled and conjointly shaped in the elongated generally cylindrical flat ended form by stuffing the edible material into and outstretching the casing therewith, the stuffing zone being provided with axially opposed zone end closures with respective generally parallel flat opposed faces between which a portion of the length of a tubular casing of thin flexible material is receivable in the zone for stuffing thereof with edible material, said opposed faces being disposed in the path of and operable by the axial expansion of the assembly to turn in and flatten circumferential portions of the casing against the respective opposite ends of the mass of edible material in the casing and produce the flattened ends of the assembly, one of the end closures having a filler opening therethrough around which the flat face thereof extends generally radially outward therefrom, the said opening being adapted to receive therein a circumferentially contracted portion of the tubular casing with an open end portion of the tubular casing projecting outwardly to provide a sleeve portion to receive endwise therein a tubular stuffing horn through which edible material is introducible into the casing portion between the opposed end closures to form the elongated generally cylindrical assembly therebetween, the tubular casing being slidably confined in the filler opening around the stuffing horn to permit retraction of the casing through the opening into the stuffing zone between the opposed end closures to provide increased length of casing in the stuffing zone between the opposed end closures to accommodate enlargement and shaping of the assembly to the generally cylindrical flat ended form in which it is shaped in the stuffing zone between the opposed end closure thereof, the zone end closure which is axially opposed to the end closure which has the filler opening being provided with fastening means by which an end of the tubular casing is securable thereto and closed.

2. A holder for making and supporting therein an elongated generally cylindrical assembly of a mass of edible material compacted in an outstretched portion of a tubular casing of thin flexible material with circumferential portions of the casing inturned radially against the mass of edible material at the ends of the assembly to provide flattened ends therefor, the holder having therein an elongated stuffing zone in which the edible material and casing are assembled and conjointly shaped in the elongated generally cylindrical flat ended form by stuffing the edible matrial into and outstretching the casing therewith, the stuffing zone being provided with axially opposed zone end closures with respective generally parallel flat opposed faces between which a portion of the length of a tubular casing of thin flexible material is receivable in the zone for stuffing thereof with edible material, said opposed faces being disposed in the path of and operable by the axial expansion of the assembly to turn in and flatten circumferential portions of the casing against the respective opposite ends of the mass of edible material in the casing and produce the flattened ends of the assembly, one of the end closures having a filler opening therethrough around which the flat face thereof extends generally radially outward therefrom, the said opening being adapted to receive therein a circumferentially contracted portion of the tubular casing with an open end portion of the tubular casing projecting outwardly to provide a sleeve portion to receive endwise therein a tubular stuffing horn through which edible material is introducible into the casing portion between the opposed end closures to form the elongated generally cylindrical assembly therebetween, the tubular casing being slidably confined in the filler opening around the stuffing horn to permit retraction of the casing through the opening into the stuffing zone between the opposed end closures to provide increased length of casing in the stuffing zone between the opposed end closures to accommodate enlargement and shaping of the assembly to the generally cylindrical flat ended form in which it is shaped in the stuffing zone between the opposed end closure thereof, the zone end closure which has the filler opening being provided with means which is cooperable with the tubular casing while extending through the filler opening to close the passage therethrough to the portion of the casing in the stuffing zone.

References Cited by the Examiner

UNITED STATES PATENTS

| | | | |
|---|---|---|---|
| 974,199 | 11/1910 | Stark et al. | 99—350 |
| 985,113 | 2/1911 | Conrad. | |
| 1,370,822 | 3/1921 | Koch | 99—350 |
| 1,794,304 | 2/1931 | Koch | 99—350 |
| 2,886,073 | 5/1959 | Beck | 17—35 X |
| 2,968,570 | 1/1961 | Pinta et al. | 99—229 |
| 3,011,895 | 12/1961 | Toepper et al. | 99—107 |

FOREIGN PATENTS 634,546  11/1927  France.

SAMUEL KOREN, *Primary Examiner.*

HYMAN LORD, LUCIE H. LAUDENSLAGER,
*Examiners.*